United States Patent

Schmid et al.

[11] Patent Number: 5,843,297
[45] Date of Patent: Dec. 1, 1998

[54] ELECTROLYSIS PROCESS AND APPARATUS

[75] Inventors: Ottmar Schmid, Markdorf; Peter Kurzweil, Immenstaad, both of Germany

[73] Assignee: Dornier GmbH, Germany

[21] Appl. No.: 723,883

[22] Filed: Sep. 23, 1996

[30] Foreign Application Priority Data

Sep. 22, 1995 [DE] Germany .................. 195 35 212.2

[51] Int. Cl.$^6$ .................. B01D 17/06; C02F 1/461; C25B 9/00
[52] U.S. Cl. .................. 205/687; 205/746; 204/252; 204/253; 204/258; 204/266
[58] Field of Search .................. 204/286, 256, 204/258, 266, 296, 237, 252; 205/742, 746, 748, 343, 344, 349

[56] References Cited

U.S. PATENT DOCUMENTS

| | | | |
|---|---|---|---|
| 3,905,884 | 9/1975 | Parenti, Jr. et al. | 205/349 |
| 3,917,520 | 11/1975 | Katz et al. | 205/349 |
| 4,399,009 | 8/1983 | Chisholm | 204/98 |
| 5,314,590 | 5/1994 | Kamiya et al. | 204/131 |

FOREIGN PATENT DOCUMENTS 1 667 366  7/1971  Germany .

OTHER PUBLICATIONS

NASA Final Report CR 66654, ?1968.
NASA Final Report CR 66654, ?1968.
Larkins et al., "Static Feed Water Elelctrolysis System Station O2 and H2 Generation", SAE Technical Paper Series, 15th Intersociety Conference on Environmental Systems, San Francisco, CA, pp. 1–12, Jul. 1985.
European Search Report Dated Dec. 9, 1996.
R.J. Davenport et al., Space Water Electrolysis: Space Station Through Advanced Missions, Journal of Power Sources, 36(1991), 235–250 No Month).
J.T. Larkins et al., Satis feed Water Electrolysis System for Space Sation $O_2$ and $H_2$ Generation; SAE Technical Paper Series, 15th Intersociety Conference on Environmental Systems, San Francisco, CA, Jul. 15–17, 1985.
NASA Final Report CR 66654 (1968) No Month.

Primary Examiner—Kathryn L. Gorgos
Assistant Examiner—Edna Wong
Attorney, Agent, or Firm—Evenson, McKeown, Edwards & Lenahan, P.L.L.C.

[57] ABSTRACT

A method and apparatus for carrying out an electrolytic process produces clean gases, such as oxygen and hydrogen. For this purpose, a porous diaphragm is arranged between the cathode and the anode of an electrolyzer, and a liquid electrolyte is fixed in the pores of the cathode and anode. A first gas chamber adjoins the cathode, while a second gas chamber adjoins the anode, and an educt chamber is separated from the first gas chamber by a membrane. An aqueous, non-corrosive solution of salts of inorganic and organic acids or mixtures of water with organic additives is used as an educt, which, compared with the electrolyte, has a higher partial water vapor pressure.

13 Claims, 6 Drawing Sheets

| SOLUTION | CURRENT DENSITY | CURRENT DENSITY V | TEMPERATURE | $P_{N_2}$/mbar | PRESSURE DIFFERENCE | |
|---|---|---|---|---|---|---|
| | | | | | $H_2$-SPACE- $\Delta P_{N2-H2}$/mbar | $O_2$-SPACE- $\Delta P_{N2-O2}$/mbar |
| PURE WATER | 200 | 1.59<br>1.58 | 52°<br>80° | 500<br>680 | 350<br>290 | 380<br>300 |
| 16.8% SODIUM ACETATE | 200 | 1.59<br>1.56 | 52°<br>60° | 500<br>480 | 350<br>330 | 360<br>345 |
| 4M POTASSIUM ACETATE | 170 | 1.52 | 60° | 260 | 179 | 183 |
| 25% GLYCERIN | 200 | 1.52 | 52° | 500 | 334 | 348 |
| 85% SACCHAROSE | 200 | 1.58 | 75° | 410 | 302 | 341 |

NITROGEN GAS CUSHION PRESSURE ABOVE THE AQUEOUS SOLUTION

FIG.3

ELECTROLYSIS PROCESS AND APPARATUS

BACKGROUND OF THE INVENTION

The invention relates to a process and to an apparatus for carrying out the electrolysis process with the object of producing clean gases, such as oxygen and hydrogen.

A known apparatus for electrolyzing water with a fixed alkaline electrolyte (FAE-electrolyzers) is illustrated in FIG. 1 (see, for example, R. J. Davenport, et al., "Space Water Electrolysis: Space Station through Advanced Missions, *Journal of Power Sources*, 36 (1991), 235–250). The core of this apparatus is the electrolysis cell. As shown in FIG. 1 hereof, it comprises the following components:

Electrodes 10, 11 between which a porous diaphragm 12 is arranged, an electrolyte solution being fixed by means of capillary forces in the pores of electrodes and diaphragm;

a hydrogen product gas chamber 9 adjoining the cathode;

an oxygen product gas chamber 8 adjoining the anode;

a chamber 7 for the educt, specifically water ($H_2O$), separated from the $H_2$-product gas chamber by means of a membrane 13;

In this construction, the feeding of the water into the educt chamber takes place by using a filling pump 1. For maintaining the water supply as well as for tempering the electrolysis cell, a delivery pump 2 causes water to flow through the educt chamber 7. In this case, the controlling of the water inlet temperature into the educt chamber takes place by way of a 3-way valve 3 in connection with a heat exchanger 4. In the water circulating system, a water accumulator 5 and a pressure transmitter 6 are also integrated which pressure transmitter 6 permits a positive pressure difference between the educt chamber 7 and the $O_2$-chamber 8 and, as a result, a positive pressure difference between the educt chamber and the $H_2$-chamber 9. The electrolysis process is initiated by the impressing of a direct voltage on the electrodes above the decomposition voltage of approximately 1.23 V (Faraday electrode reaction). In this case, the electrolysis gases are formed within the pores of the electrodes filled with the electrolyte and are moved into the adjoining gas chambers of the electrolysis cell. A corresponding pore distribution of the electrodes prevents a pushing-out of electrolyte with the escaping electrolysis gases. In this case, a phase separation is achieved between the electrolysis gases and the electrolyte within the electrodes; additional gas separators are saved; and the electrolysis gases can be reused directly.

The electrolysis water supply to the electrodes takes place by gas diffusion from the educt chamber by way of the membrane and the hydrogen chamber to the electrolyte in the electrodes. The driving force of the water vapor diffusion is the difference of the water vapor partial pressures in the water reservoir and in the electrodes:

$$\Delta P = P_{reservoir} - P_{electrode} \quad (1)$$

The membrane between the water chamber and the gas chamber of the cathode prevents a considerable contamination of the electrodes by means of impurities in the water reservoir and causes a high useful life of the electrodes. So far, only hydrophobic membranes have been used.

The described technology with the fixed electrolyte was developed and tested for space travel applications. With a view to an economical terrestrial application, additional disadvantages occur in the operational behavior which will be explained in detail in the following.

a) Problems of the Irreversible Dilution of the Electrolyte

Known electrolyzers with a fixed electrolyte are conceived only for the use with superclean water as the educt. This has the disadvantage that a continuous electrolyte dilution takes place in the diaphragm which results in considerable losses of output and finally in an operational failure of the electrolyzer. The cause of this dilution—also called "flooding"—is the fact that as a result of the electrolysis process less water is split into $H_2$ and $O_2$ in the electrolyte-filled electrodes than is transported by way of the membrane to the electrolyte. This means that the partial water vapor pressure difference according to Equation (1) between the reservoir and the electrolyte in the cathode is too large for the operation. The dilution of the electrolyte leads to a volume enlargement until finally the electrolyte filling ratio of the electrodes exceeds the volumetric capacity of the porous electrode structures.

Excess electrolyte will then flow out into the gas chambers of the cell and is discharged there by simultaneously produced gases. This electrolyte loss in the electrodes cannot be undone. In the operation in practice, the permissible operating parameters, such as current, $H_2$-product gas flow, stoppage periods, etc. are therefore considerably limited. During the stoppage or during the storage of the electrolyzer, the dilution of the electrolyte takes place to an increased degree.

b) Problem of Chemical Reactivity

The avoiding of the electrolyte dilution by the use of caustic potash solution as the educt is described in the *NASA-Final Report CR* 66, Page 54 of 1968. However, the basic possibilities of the use of caustic potash solution described there are eliminated for several reasons:

1. Because of their corrosion-promoting effect, aggressive media, such as caustic potash solution, are not suitable for the use in the water reservoir (high requirements with respect to material).

2. The use of caustic potash solution, particularly in the same concentration as in the fixed electrolyte at the start of the electrolysis, represents a partial water vapor pressure difference which is too small; does not guarantee a sufficient water supply and limits the operational current density and thus the gas production.

3. Because of the high conductivity of the caustic potash solution, parasitic currents occur which lead to losses and rapidly accelerate the corrosion of the system.

4. The flow characteristics of the caustic potash solution present sealing problems which cannot be mastered by means of the known materials.

5. A safety risk is created by the pumping transfer of caustic potash solution in the reservoir.

It is therefore an object of the invention to provide a process as well as an apparatus by means of which the unfavorable dilution of the electrolyte in the electrolysis operation described above in Point a) is prevented without the risks mentioned in b). Even after stoppage periods of several weeks and during storage, no excessive dilution, which causes the discharge of the electrolyte from the pore system of the electrodes, must take place without the previous removal of the educt from the educt chamber.

This object is achieved by means of the process and apparatus invention in which,, instead of pure water, a non-corrosive aqueous solution, emulsion or suspension (in the following only called "solution":) is used as the educt which, compared with the electrolyte, has a higher partial water vapor pressure ($P_{W,F}$). The basic idea is that the partial water vapor pressure difference between the water reservoir and the electrolyte space is reduced and the inflow of water into the electrolyte space is controlled so that a loss of electrolyte by an $H_2O$-dilution of the electrolyte is prevented. Gases, such as hydrogen and oxygen, are obtained as the products.

The aqueous solution from the educt chamber is supplied to the cathode with a given vapor pressure by way of the membrane by means of pervaporation.

Preferably aqueous solutions of salts of inorganic and organic acids (acetates, phosphates, etc.), mixtures of water with organic additives (for example, glycols, urea, glycerin) are used.

For example, a concentrated, aqueous solution with a high electric conductivity is used as the electrolyte. Preferred embodiments for this purpose are: acids, bases and metallic salt solutions with a high electric conductivity, such as potassium hydroxide or other alkaline and earth-alkaline hydroxides in concentrations of approximately 5 to 12 mol/liter; sulfuric acid of approximately 2 to 5 mol/liter; phosphoric acid, etc.

When, according to the invention, aqueous solutions are used as the educt, the known hydrophobic membrane systems can be used as well as all membranes described in the following in connection with the apparatus according to the invention.

Other objects, advantages and novel features of the present invention will become apparent from the following detailed description of the invention when considered in conjunction with the accompanying drawings.

BRIEF DESCRIPTION OF THE DRAWINGS

FIG. 3 is a table which shows operating data of an electrolyzer during the operation with different aqueous solutions according to the invention;

DETAILED DESCRIPTION OF THE INVENTION

Figure 1:
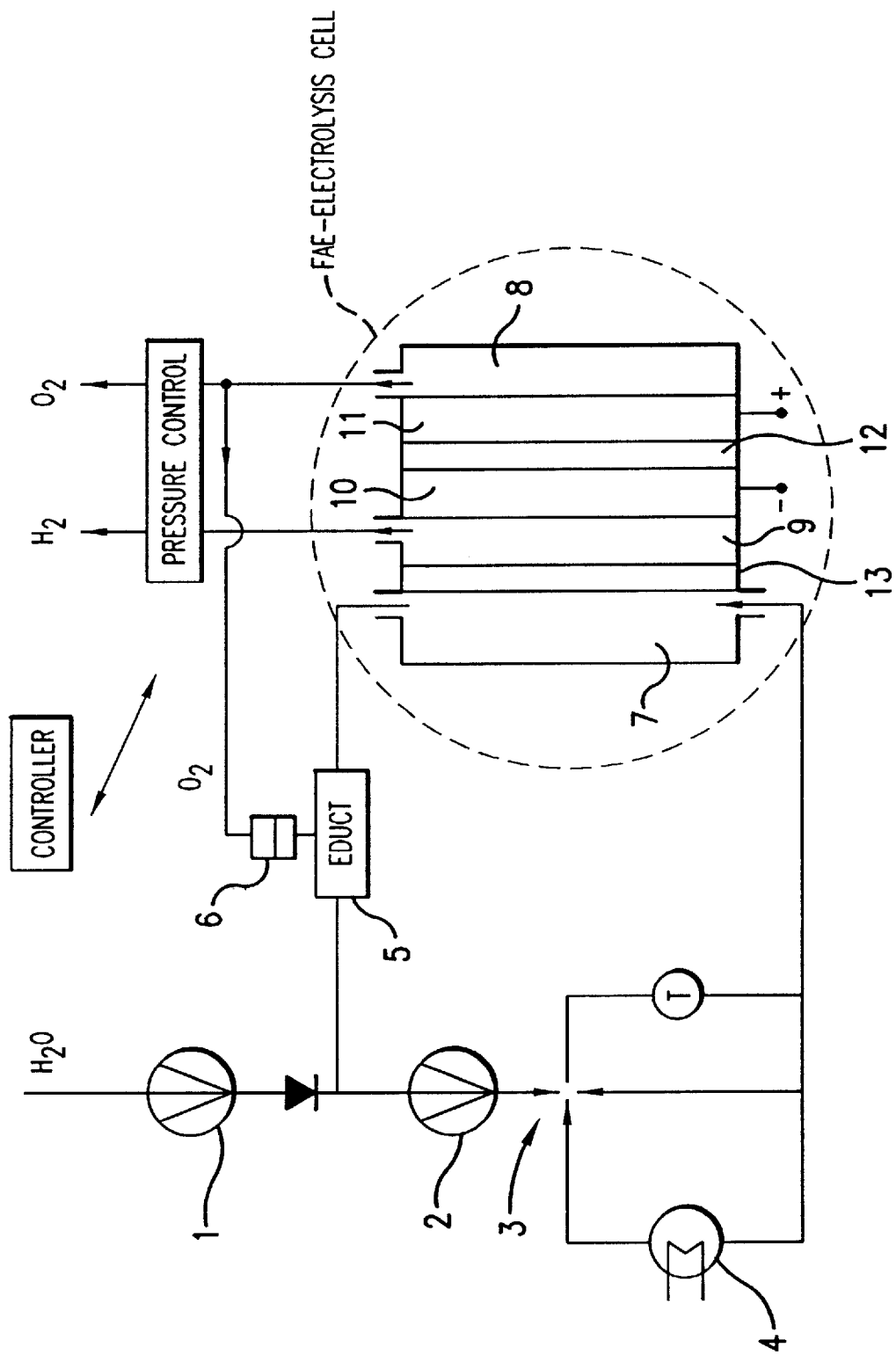
FIG. 1 is a view of the electrolyzer corresponding to the state of the art and as described in the introduction to the specification.

The following table contains a listing of aqueous solutions which may be used in the process and apparatus according to the invention, with the safety-technical risk analyzed, should the substance unexpectedly enter the fixed electrolyzer or contact the electrodes.

"Not dangerous" means that, in the case of a proper handling, no special safety measures must be taken. There may be a low biorisk or water risk. It is always recommended to protect the hands and eyes.

TABLE I

| Solution | Vapor Pressure mbar at 90° C. | Solubility g/l (20° C.) | Safety and Suitability |
|---|---|---|---|
| Reference: | | | |
| KOH 20% | 560 | | caustic, corrosive |
| KOH 10% | 650 | ++ | very conductive, very exothermal dissolving process |
| Water | 701 | | |
| Inorganic Solutions | | | |
| a) Alkaline and Earth-Alkaline Salt Solutions | | | |
| Lithium chloride | | 522 | not dangerous (0) |
| | | ++ | toxic in large quantities, slightly basic (pH 7–9) |
| Lithium chloride | | | anodic chlorine |
| Calcium chloride | | 820 | precipitation |
| Magnesium | | ++ | not dangerous $X_n$ |
| Chloride | | 1,670 | slightly acidic (pH 5–7) |
| 3M sodium sulfate | 627 | 900 | not dangerous |
| 10M sodium hydrogen | 407 | 670 | acidic (pH 1), not dangerous ($X_i$) |
| Sodium teraborate | | 51 | alkaline (pH 9–10) |
| b) Buffer Solutions | | | |
| Sodium hydrogen phosphate 4M | 596 | 218 | viscous, 5-molar >75° 6M >90° C. usable |
| Potassium dihydrogen phosphate 5M | 591 | 222 | viscous; 5-molar >80° 6M >90° C. usable |
| Sodium Phosphate | | 258 | alkaline (pH 12) not dangerous |
| Organic Multicomponent Systems | | | |
| a) Alcohols | | | |
| Ethylene glycol | | ++ | electrode poisons |
| Diethylene glycol | | ++ | reaction with caustic potash solution |
| PEG 200 40% | 630 | ++ | non-conductive |
| 25% glycerin | 640 | ++ | |
| b) Sugar Solutions | | | |
| Saccharose | | + | relative to caustic potash solution |
| c) Nitrogen Compounds | | | |
| Urea | | | |
| 25% | approx. 650 | ++ | ammonia formation on the electrodes, reaction with caustic potash solution |
| 50% | approx. 550 | | |
| d) Salts of Organic Acids | | | |
| Sodium acetate | | | |
| 16.7% | approx. 650 | | |
| 28.6% | approx. 550 | | |
| Potassium | | | |
| 4M | 540 | ++ | anodic decarboxylizing |
| 5M | 460 | ++ 2,530 | slightly basic (pH 8) |
| 6M | 440 | | danger of potash formation |
| 7M | 420 | ++ | dissolves in air |
| Sodium | | – | |

TABLE I-continued

| Solution | Vapor Pressure mbar at 90° C. | Solubility g/1 (20° C.) | Safety and Suitability |
| --- | --- | --- | --- |
| propionate | | | |
| Calcium propionate | | | |
| Sodium oxalate | | | -- |
| Sodium succinate | | | - |
| Sodium benzoate | | | -- |
| Sodium tastrate | | | - |
| Sodium citrate 54% | approx. 600 | | + |
| Potassium citrate | | | + |
| Sodium stearate | | | -- |

Explanation:
-- very poor,
- conditional,
+ good,
++ very good,
(O) fire risk,
(c) caustic,
($X_1$) low-grade toxic,
($X_i$) irritating.

The lowering of the vapor pressure, the lowering of the freezing point and the raising of the boiling point of solutions in comparison to the pure solvent depend on the mol mass of the dissolved substance and the concentration of the solution. Salts, which dissociate because of the solvating in the solvent, cause particularly advantageous vapor pressure reductions because of the entropy increase.

The solubility of the compounds in water alone, however, limits the use of highly concentrated salt solutions.

Electrotechnically stable salts are perchlorates, nitrates and phosphates. Chlorides are oxidized anodically to form chlorates and chlorine.

Bromides result in anodic bromide and bromine. In sensitive persons, halogenides occasionally cause allergic reactions. When heated, nitrates release nitrous fumes and must therefore be processed under fire protection. Nitrates and phosphates in large amounts contribute to the entrophying of the waters. Hydroxides have a very corrosive and caustic effect and partially react briskly with metals (aluminum, tin, zinc, among others), ammonium compounds, halogens and acids so that they are less suitable. It should be noted that caustic potash solution can be basically used as the supply fluid.

EXAMPLE 1

Figure 2:
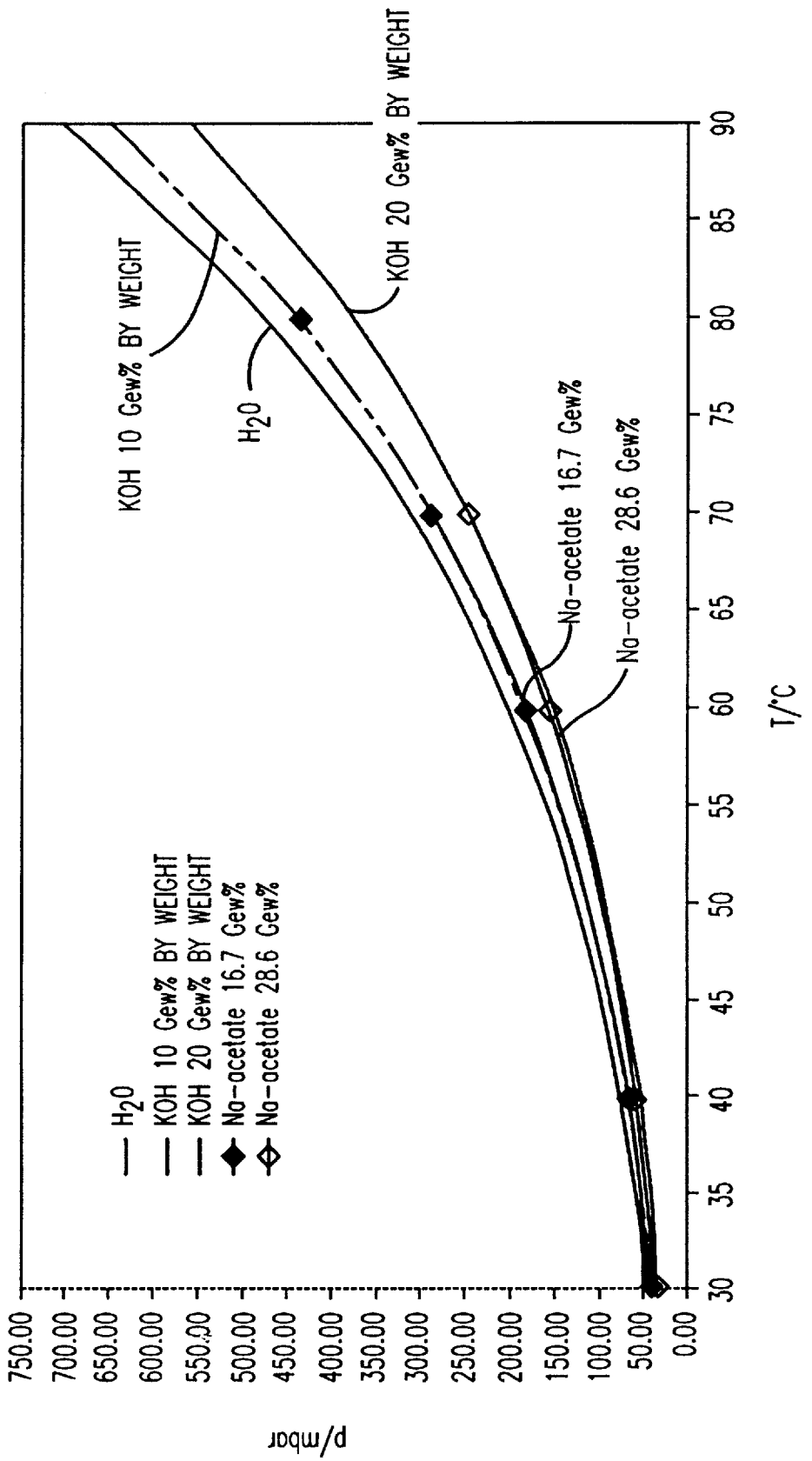
FIG. 2 is a graphic presentation of the temperature of the partial water vapor pressures of Na acetate solutions according to the invention in comparison to KOH and $H_2O$.

Particularly advantageously, sodium acetate solution is used as the aqueous solution. A 16.8% by weight solution has approximately the same vapor pressure as 10% caustic potash solution. FIG. 2 shows the temperature course of the partial water vapor pressures of aqueous Na acetate solutions in comparison to KOH and $H_2O$.

Sodium acetate solution has no damaging long-term effect on the transport characteristics of the supply membrane (for example, PTFE) and the stability of sealing materials (for example, EPDM). The electrolyzer is operated as in the case of a supply with pure water. The water quantity sufficient for the selected current density and gas production can be adjusted by means of the operating temperature.

Also after the switching-off of the electrolyzer or in the cyclical operation, the use of sodium acetate solution in contrast to water does not lead to any durable deterioration of the cell voltages.

A contamination of the electrodes by acetate or a daughter product was not found.

If, in contrast, in the long-term operation, caustic potash solution is used for the purpose of a comparison as the supply fluid, the membrane and the sealing materials will be damaged. Corrosion will occur in the storage tank, and the electrolysis gases contain traces of caustic potash solution which cause the pH-value of the wash bottle which follows to rise to pH 9–10.

With sodium solution as the supply fluid, the pH-value in the gas washer is below pH 8.

The sodium acetate solution as the educt is particularly advantageous because it meets the following criteria:

a) it has a vapor pressure reduction corresponding to at least 5% by weight of a caustic potash solution and ideally 10–20% of a KOH solution;

b) as a result of its composition, the efficiency of the electrolyzer is not limited, as, for example, by contamination of the electrolyte or the electrodes by the solution substance;

c) it is of low electric conductivity so that leak currents by way of housing components are avoided;

d) non-toxic, non-corrosive, non-caustic and pyrotechnically safe;

e) economically advantageously available;

f) can be disposed of without problems, not dangerous for the drinking water;

g) the freezing point is below –20° C. so that the operation of the electrolyzer is ensured at low temperatures;

h) the solubility in water is high;

i) the viscosity of the solution is not very increased in comparison to pure water;

j) the boiling temperature is >120° C.;

k) at operating temperatures, no decomposition products, such as $CO_2$, $NO_X$ or halogens, evaporate;

l) under operating conditions at approximately 80° C., the solution is stable for a long time;

m) the solution has no durably unfavorable influence on the material characteristics of special steel, nickel, carbon fibers and plastics.

EXAMPLE 2

The suitability of biooligomers and biopolymers as vapor-pressure-lowering additives was tested by means of saccharose solution. For a vapor pressure lowering equivalent to 10% caustic potash solution, very concentrated sugar solutions are required whose high viscosity impairs the flow through the water space.

EXAMPLE 3

Polyvalent alcohols, such as glycerin and polyethylene glycol 200 are basically suitable as a vapor-pressure-reducing additive, but with a disadvantageous influence on the material characteristics of membranes and seals. If the substances unintentionally advance to the electrodes, disturbing secondary reactions are the result.

Despite the slight impairments found in the case of the aqueous solutions according to Example 2 and 3, these substances are basically suitable for the application according to the invention. In particular, the problems illustrated with respect to the caustic potash solution in Numbers 1 to 5 do not occur.

Corresponding to the apparatus according to the invention, a membrane is used which has at least one porous hydrophilic membrane layer and/or at least one dense membrane layer. The basic idea also in this case is the lowering of the partial water vapor pressure above the water supply system (membrane surface to the cathodic product gas chamber).

It should be noted that in this application, membranes are structures with only one layer as well as those with several layers. In the literature, the latter are also called membrane systems. A dense membrane layer means that the layer is non-porous.

The desired partial water vapor pressure reduction is achieved as follows in the case of the individual membranes:
1. Membrane with at Least One Hydrophilic Porous Layer By means of the capillary forces of the hydrophilic pores, a vapor pressure reduction is achieved on the cathode side. If, in addition, a hydrophobic layer exists in the direction of the cathodic product gas chamber, an emerging of the educt solution from the educt chamber to the $H_2$-chamber can be prevented at the same time.

Because of the capillary effect of the pores of the membrane layer, a vapor pressure reduction is achieved which would correspond, for example, to an at least 5% by weight potassium hydroxide solution. The vapor pressure reduction by means of hydrophilic porous membranes by the capillary forces of the pores will be explained in detail in the following:

According to the laws of thermodynamics, the vapor pressure exhibited by a fluid depends not only on the temperature but also on the external forces which affect the fluid.

In the case of an equilibrium between the fluid and the vapor under the effect of an external pressure $p_F$, the following relationship applies $$v_D \cdot dp_D = v_F \cdot dp_F$$

$v_F$: specific volume fluid
$v_D$: specific volume water vapor
$dp_F$: external pressure on fluid
$dp_D$: water vapor pressure reduction With the introduction of the density $q_F = 1/v_F$ and the validity of the ideal gas law, the following applies $P_D/P_D^* = \exp(p_F/q_F R_D T)$ (1) $P_D^*$: saturated vapor pressure ($P_F = 0$)

A fluid rises in a capillary with a hydrophilic surface because of the forces on the boundary surface between the fluid and the wall. From the equilibrium of forces, the tensile stress at the meniscus of the fluid in the capillary is as follows:

$$p_F = g q_F h = -2\, O/r \quad (2)$$

$O$: surface tension $C1$ $r$: capillary radius $C2$

Equation (2) in (1) is:

$$p_D/p_D^* = \exp(-2\, O/(r\, q_F R_D T)) \quad (3)$$

The use of a hydrophilic membrane with a defined pore size and pore distribution produces a defined water vapor pressure reduction. Such a membrane with a pore size of, for example, 0.01 micrometers can cause a water vapor pressure reduction of approximately 10%.

2. Membrane with at Least One Dense Layer

The extremely low solubility of the water in the membrane represents a mass transport resistance which also exists during a stoppage or storage of the electrolyzer and prevents an unacceptable dilution of the electrolyte. The vapor pressure reduction by means of non-porous membranes will be explained in the following by means of FIG. 4.

Figure 4:
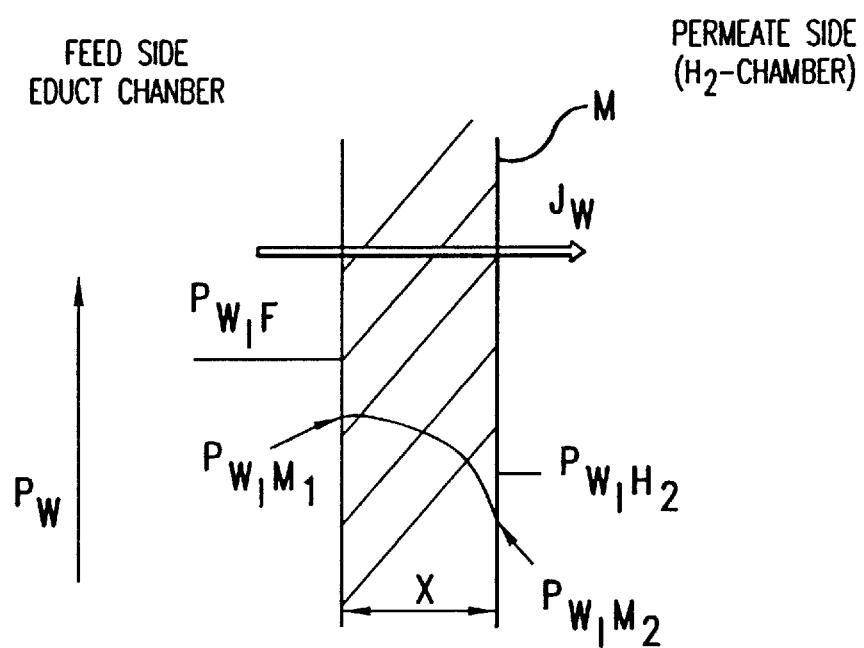
FIG. 4 is a basic diagram for explaining the water vapor reduction with non-porous membranes.
Figure 5A:
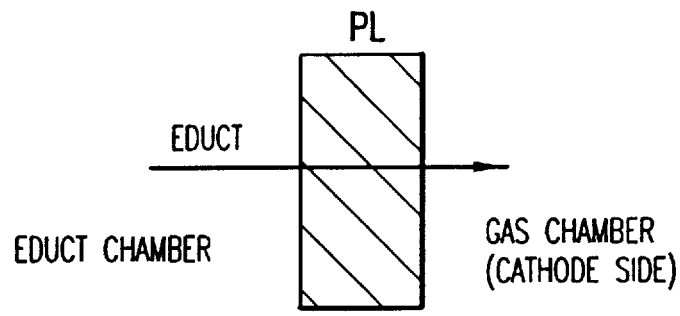
FIG. 5 is a view of several embodiments of the used membranes corresponding to the invention.
Figure 5B:
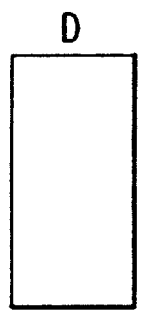
Figure 5C:
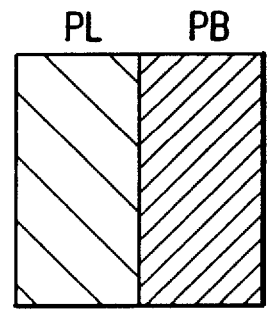
Figure 5D:
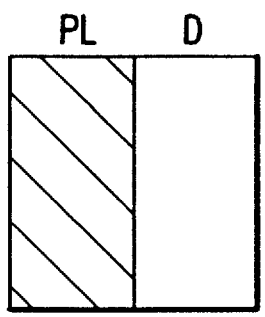
Figure 5E:
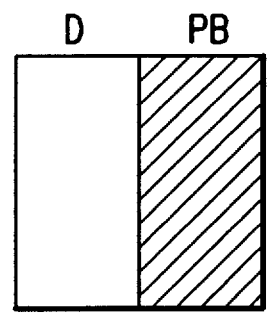

In the form of a basic diagram, FIG. 4 shows the course of the partial water vapor pressure $p_w$ in a water-selective nonporous membrane M; wherein $p_{w,i}$: partial water vapor pressure in the area i X: local coordinate along the membrane thickness.

The pervaporative transport of water or water vapor through the water-selective non-porous membrane M is produced because of the partial water pressure differences between the educt chamber and the $H_2$-chamber. In this case, the pervaporation is based on the water vapor permeability of the used membrane M. According to the solution model, the process illustrated in FIG. 4 comprises the following steps:

Sorption of $H_2O$ into the membrane ($p_{W,F} \rightarrow p_{W,M1}$)

Diffusion of $H_2O$ through the membrane ($p_{W,M1} \rightarrow p_{2w,M2}$)

Desorption of $H_2O$ into the $H_2$-chamber caused by the partial water vapor reduction of the electrolyte.

The transport of $H_2O$ through a water-selective nonporous membrane can be described by the following equation:

$$J_w = K_w \cdot D_w \cdot (dp_w/dx)$$

$J_w$: $H_2O$-flow
$K_w$: solubility coefficient for $H_2O$
$D_w$: diffusion coefficient for $H_2O$
$p_W$: partial water vapor pressure The $H_2$-flow is determined by its solubility as well as by the diffusion capacity of the membrane. In addition, the required $H_2$-flow in the cells can be adjusted by adapting the membrane thickness.

By means of the apparatus according to the invention, a dilution of the fixed electrolyte is limited, for example, to 5% by weight alkaline hydroxide during the operation as well as during stoppage and storage of the electrolyzer.

The following can, for example, be used as the electrolyte: Acids, bases and metallic salt solutions with a high electric conductivity, such as potassium hydroxide or other alkaline and earth-alkaline hydroxides in concentrations of approximately 5 to 12 mol/liter; sulfuric acid of approximately 2 to 5 mol/liter; phosphoric acid, etc.

When the membrane according to the invention is used, water as well as the above-described aqueous solutions can be used as the educt.

The electrolysis process can be carried out preferably in the pressure range of from zero bar to 200 bar (excess pressure) and in the temperature range of from −300 to 150° C.

The process according to the invention and the apparatus according to the invention cause a significant improvement of the operational behavior and expands the application spectrum of the electrolyzer. By means of the invention, a largely self-regulating $H_2O$-supply for the diaphragm/electrode system is achieved.

Embodiments of the Membrane

In a first embodiment, the membrane consists of a single layer, specifically of a porous and hydrophilic layer. The following materials are used for this membrane layer:

PTFE hydrophilized
PEEK hydrophilized

Polysulfone (PSU) hydrophilized

Polyether sulfone (PES) hydrophilized

Metallic membranes, for example, made of special steel

Commercially available ultrafiltration and reverse osmosis membranes with pore sizes of approximately $10^{-2}$ to $10^{-3}$ $\mu$m thicknesses to above 1 mm porosity >20% can also be used.

In a second embodiment, the membrane also consists of an individual layer, this layer being a dense layer. For this membrane layer, for example, the following membranes and materials are used.

Diffusion membranes made of:

PTFE

Polypropylene

Fluosilicones

Silicone

Silicone rubber

Commercially available gas permeation and particularly pervaporation membranes of various thicknesses can also be used which may be symmetrical as well as asymmetrical with a carrier frame.

In a third embodiment, the membrane is constructed such that, in addition to the porous and hydrophilic layer, which is arranged toward the educt chamber, it has a porous hydrophobic layer which is arranged toward the $H_2$-production gas chamber.

For the porous, hydrophilic layer, the membranes mentioned in the first embodiment are used. For the porous, hydrophobic layer, for example, the following materials are used:

PTFE

Polypropylene (PP)

Polyvinylidene fluoride (PVDF)

PE

Also commercially available hydrophobic microfiltration membranes with pore sizes of from 0.01 to 2 $\mu$m thicknesses up to 0.5 mm porosity >30% can be used.

The two participating membrane layers can be fixedly connected with one another (composite membranes or asymmetrical membranes) or be loosely pressed in the cell.

In another, fourth embodiment, the membrane is constructed such that, in addition to the porous hydrophilic layer, which is arranged toward the educt chamber, it has a dense layer arranged toward the $H_2$-product gas chamber.

For the porous hydrophilic layer, the membrane layers described in the first embodiments may be used. For the dense layer, the membrane layers described in the second embodiment may be used. The two participating membrane layers can be fixedly connected with one another or can be loosely pressed in the cell.

In a fifth embodiment, the membrane has a dense layer toward the educt chamber and a porous hydrophobic layer toward the $H_2$-product chamber. For the dense layer, the membrane layers described in the second embodiment can be used. For the porous hydrophobic layer, the membrane layers described in the third embodiment can be used. The two participating membrane layers can be fixedly connected with one another or loosely pressed in the cell.

For the fourth and fifth embodiment, asymmetrical membranes can also be used in the case of which the non-porous layer is constructed to be very thin (for example, 0.2gm) in comparison to the porous layer.

Summarizing, FIG. 5 shows the above-described membranes corresponding to the invention in a schematic representation. It applies to all five illustrated membranes that the educt chamber follows on the left of the membrane while the cathode follows on the right of the membrane.

The symbols used in FIG. 5 mean the following:

PL: porous hydrophilic

PB: porous hydrophobic

D: dense

Figure 6:
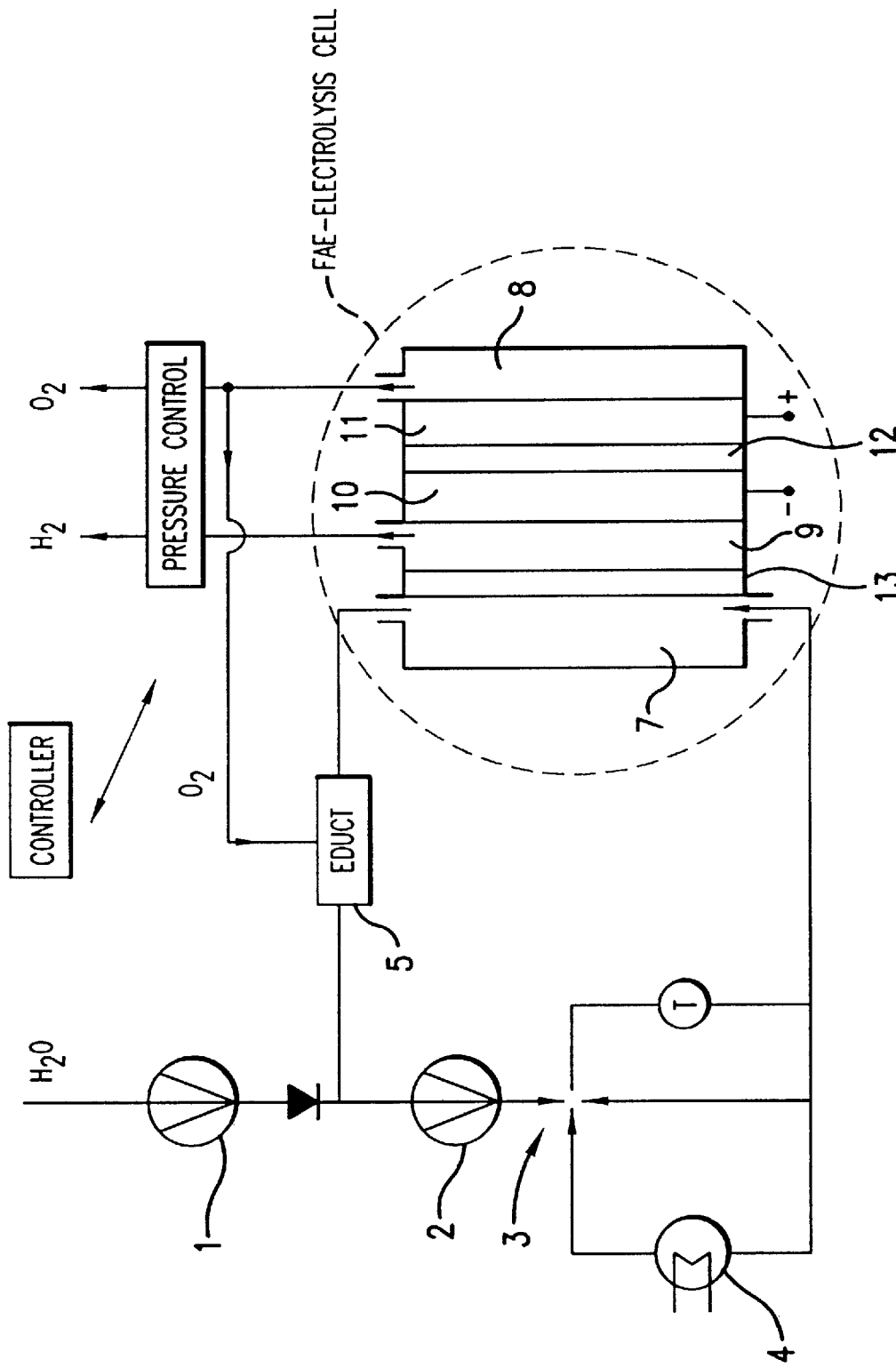
FIG. 6 is a view of an electrolyzer corresponding to the invention.

The above-mentioned embodiments two to five have the additional advantage that an admission of differential pressure of at least 0.5 bar is achieved from both sides of the membrane. As a result, a direct pressurizing of the water supply chamber by way product gases is permitted. Such a construction is illustrated in FIG. 6. The pressure in the $O_2$-product gas chamber is used directly for acting upon the educt in the water reservoir (accumulator) 6. Additional devices for the admission of pressure to the educt, such as pressure transmitters (FIG. 1) or the use of an external gas will now no longer be required.

Several electrolyzers according to the invention can advantageously be connected in series and can be stacked against one another or above one another to form a stack.

Although the invention has been described and illustrated in detail, it is to clearly understood that the same is by way of limitation. The spirit and scope of the present invention are to be limited only by the terms of the appended claims.

We claim:

1. An electrolysis process for use in an electrolyzer having porous electrodes, including at least a cathode and an anode;

a porous diaphragm arranged between said porous electrodes;

a liquid electrolyte fixed in pores of the electrodes and of the diaphragm;

a first product gas chamber adjoining the cathode;

a second product gas chamber adjoining the anode; and an educt chamber separated from the first product gas chamber by a membrane; said process comprising:

using an aqueous, non-corrosive solution as an educt which, compared with the electrolyte, has a higher partial water vapor pressure; and supplying electrolysis water from the educt to the electrolyte which is fixed in the pores of the electrodes, by gas diffusion from the educt chamber via the membrane and the first product gas chamber;

wherein said aqueous solution is an aqueous solution of salts of inorganic and organic acids or mixtures of water with organic additives.

2. Process according to claim 1, wherein the aqueous solution contains sodium acetate.

3. Process according to claim 1, wherein the electrolyte is a concentrated, aqueous solution having a high electric conductivity.

4. Process according to claim 1, wherein said aqueous solution comprises at least one material selected from the group consisting of phosphates and acetates.

5. Process according to claim 1, wherein said organic additives comprise at least one material selected from the group consisting of glycols, urea and glycerine.

6. An electrolyzer comprising:

porous electrodes, including at least a cathode and an anode;

a porous diaphragm arranged between said porous electrodes;

a liquid electrolyte fixed in pores of the electrodes and the diaphragm;

a first product gas chamber adjoining the cathode;

a second product gas chamber adjoining the anode; and an educt chamber separated from the first product gas chamber by a membrane having at least one nonporous layer.

7. Electrolyzer according to claim 5, wherein the membrane consists of a single nonporous layer.

8. Electrolyzer according to claim 7, wherein an educt which is used in said electrolyzer is pressurized directly by a product gas pressure.

9. Electrolyzer according to claim 6 wherein the membrane has a porous hydrophilic layer disposed toward the educt chamber and has a porous hydrophobic layer disposed toward the first product gas chamber.

10. Electrolyzer according to claim 6 wherein the membrane has a porous hydrophilic layer disposed toward the educt chamber and has a dense layer disposed toward the first product gas chamber.

11. Electrolyzer according to claim 6, wherein the membrane has a nonporous layer disposed toward the educt chamber and has a porous hydrophobic layer disposed toward the first product chamber.

12. Electrolyzer according to claim 6, wherein the electrolyte is a concentrated, aqueous solution having a high electric conductivity.

13. Electrolyzer arrangement, comprising a plurality of series-connected electrolyzers according to claim 6.

* * * * *